United States Patent
Boutros et al.

(10) Patent No.: US 11,870,684 B2
(45) Date of Patent: Jan. 9, 2024

(54) MICRO-LOOP AVOIDANCE IN NETWORKS

(71) Applicant: Ciena Corporation, Hanover, MD (US)

(72) Inventors: Sami Boutros, Union City, CA (US); Sowmya Chandran, San Jose, CA (US); Ram Parameswaran, San Jose, CA (US); Arun Prakash, Santa Clara, CA (US); Muthurajah Sivabalan, Kanata (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/903,200

(22) Filed: Sep. 6, 2022

(65) Prior Publication Data

US 2023/0071325 A1  Mar. 9, 2023

Related U.S. Application Data

(60) Provisional application No. 63/242,318, filed on Sep. 9, 2021.

(51) Int. Cl.
*H04L 45/28* (2022.01)
*H04L 45/00* (2022.01)
*H04L 45/023* (2022.01)

(52) U.S. Cl.
CPC ............ *H04L 45/28* (2013.01); *H04L 45/023* (2013.01); *H04L 45/22* (2013.01)

(58) Field of Classification Search
CPC ......... H04L 45/28; H04L 45/22; H04L 45/50; H04L 45/00; H04L 45/16; H04L 47/825
See application file for complete search history.

(56) References Cited

U.S. PATENT DOCUMENTS

| | | |
|---|---|---|
| 7,120,792 B1 | 10/2006 | Jacobson et al. |
| 7,197,573 B1 | 3/2007 | Jacobson et al. |
| 7,430,176 B2 | 9/2008 | Nalawade et al. |
| 7,539,191 B1 | 5/2009 | Jacobson |
| 7,684,351 B2 | 3/2010 | Vasseur et al. |
| 8,135,834 B1 | 3/2012 | Jacobson et al. |
| 8,274,901 B1 | 9/2012 | Casner et al. |
| 8,422,502 B1 | 4/2013 | Alaettinoglu et al. |

(Continued)

FOREIGN PATENT DOCUMENTS

| | | |
|---|---|---|
| EP | 3 038 301 B1 | 3/2020 |
| WO | 2021/0967231 A1 | 4/2021 |

OTHER PUBLICATIONS

Shand et al., "A Framework for Loop-Free Convergence," Internet Engineering Task Force (IETF), Category: Informational, ISSN: 2070-1721, Jan. 2010, pp. 1-22.

(Continued)

*Primary Examiner* — Chirag R Patel
(74) *Attorney, Agent, or Firm* — Baratta Law PLLC; Lawrence A. Baratta, Jr.

(57) ABSTRACT

Systems and methods for micro-loop avoidance include detecting a remote link failure in a network and identifying an associated Point of Local Repair (PLR); determining destinations in the network that are impacted due to the remote link failure; and installing of a temporary tunnel to the PLR. The steps can further include sending traffic destined for nodes impacted by the remote link failure via the temporary tunnel to the PLR. The temporary tunnel can be implemented by a node Segment Identifier (SID) for the PLR.

20 Claims, 6 Drawing Sheets

(56) References Cited

U.S. PATENT DOCUMENTS

| | | |
|---|---|---|
| 8,824,331 B1 | 9/2014 | Alaettinoglu et al. |
| 8,937,946 B1 | 1/2015 | Kanna et al. |
| 9,979,629 B2 | 5/2018 | Sivabalan et al. |
| 10,033,623 B2 | 7/2018 | Jain et al. |
| 10,158,558 B1 | 12/2018 | Ward et al. |
| 10,165,093 B2 | 12/2018 | Filsfils et al. |
| 10,171,338 B2 | 1/2019 | Filsfils et al. |
| 10,250,494 B2 | 4/2019 | Sivabalan et al. |
| 10,277,558 B2 | 4/2019 | Khan et al. |
| 10,291,516 B2 | 5/2019 | Bryant et al. |
| 10,454,821 B2 | 10/2019 | Filsfils et al. |
| 10,567,295 B2 | 2/2020 | Barton et al. |
| 10,740,408 B2 | 8/2020 | Ramasamy et al. |
| 10,833,976 B2 | 11/2020 | Saad et al. |
| 10,868,755 B2 | 12/2020 | Filsfils et al. |
| 11,057,278 B1 | 7/2021 | Côté et al. |
| 2013/0089100 A1* | 4/2013 | Zhao ............... H04L 45/22 370/395.5 |
| 2015/0271034 A1 | 9/2015 | Kanna et al. |
| 2015/0281045 A1* | 10/2015 | Torvi ............... H04L 45/28 370/228 |
| 2016/0057049 A1 | 2/2016 | Jacobson et al. |
| 2016/0191324 A1 | 6/2016 | Olofsson et al. |
| 2019/0297017 A1 | 9/2019 | Pignataro et al. |
| 2019/0379601 A1 | 12/2019 | Khan et al. |
| 2020/0112495 A1 | 4/2020 | Attarwala et al. |
| 2020/0153856 A1 | 5/2020 | Nainar et al. |
| 2020/0220811 A1 | 7/2020 | Shah |
| 2021/0014146 A1* | 1/2021 | Chen ............... H04L 67/56 |
| 2021/0092043 A1 | 3/2021 | Filsfils et al. |
| 2021/0160174 A1 | 5/2021 | Kashyap et al. |
| 2021/0243095 A1 | 8/2021 | Attarwala et al. |
| 2022/0070084 A1* | 3/2022 | Parakala ............ H04L 45/12 |

OTHER PUBLICATIONS

Litkowski et al., "Micro-loop Prevention by Introducing a Local Convergence Delay," Internet Engineering Task Force (IETF), Category: Standards Track, ISSN: 2070-1721, Mar. 2018, pp. 1-26.

* cited by examiner

MICRO-LOOP AVOIDANCE IN NETWORKS

CROSS-REFERENCE TO RELATED APPLICATION(S)

The present disclosure claims priority to U.S. Provisional Patent Application No. 63/242,318, filed Sep. 9, 2021, the contents of which are incorporated by reference in their entirety.

FIELD OF THE DISCLOSURE

The present disclosure generally relates to networking. More particularly, the present disclosure relates to systems and methods for micro-loop avoidance in networks that utilize tunneling mechanism, for e.g., in Multiprotocol Label Switching (MPLS) networks.

BACKGROUND OF THE DISCLOSURE

Micro-loops are a standard problem in network topologies, there are IETF RFCs and drafts that address this problem. RFC 5715, A Framework for Loop-Free Convergence, January 2010, the contents of which are incorporated by reference, defines micro-loops, namely a micro-loop is a packet forwarding loop that may occur transiently among two or more routers in a hop-by-hop packet forwarding paradigm. RFC 8333, Micro-loop Prevention by Introducing a Local Convergence Delay, March 2018, the contents of which are incorporated by reference, is an IETF standard that provide a simple solution to solve micro-loops caused by local link failures. Of note, RFC 8333 can only address micro loops caused due to local link failures. The IETF draft tools.ietf.org/pdf/draft-bashandy-rtgwg-segment-routing-uloop-11.pdf does have solutions for remote link faults, however it involves P & Q space calculations which has high complexity.

BRIEF SUMMARY OF THE DISCLOSURE

The present disclosure relates to systems and methods for micro-loop avoidance in networks that utilize tunneling mechanism, e.g., in Multiprotocol Label Switching (MPLS) networks. Specifically, the present disclosure addresses micro-loops due to remote link failures. This approach utilizes a simplified tunneling mechanisms with minimal overhead. The ingenuity of the proposed solution lies in its efficiency—the overhead/footprint of the solution is small while we gain much from it in terms of traffic loss seen during convergence. This helps to meet customers Service Layer Agreement (SLA) requirements, and cleverly utilizes local micro-loop avoidance solutions at the Point of Local Repair (PLR) to handle micro-loops caused due to remote link faults also. Through this solution, if a remote link fails, traffic can leverage existing loop-free backups at the PLR nodes and tunnel its way to reach the destination in a loop-free manner during convergence, thus resulting in minimal to no traffic loss due to micro-loops.

In various embodiments, the present disclosure includes a method having steps, a node including a plurality of ports, switching circuitry, and a controller configured to implement the steps, and a non-transitory computer-readable medium having instructions stored thereon for programming a node to perform the steps.

The steps can include detecting a remote link failure in a network and identify an associated Point of Local Repair (PLR), determining destinations in the network that are impacted due to the remote link failure, and causing installation of a temporary tunnel to the PLR. The steps can further include sending traffic destined for nodes impacted by the remote link failure via the temporary tunnel to the PLR. The temporary tunnel can be implemented by a node Segment Identifier (SID) for the PLR. The temporary tunnel can be implemented for a predetermined time period, and wherein the steps further include deleting the temporary tunnel upon expiry of the predetermined time, wherein the predetermined time is selected to ensure convergence at nodes in the network. A delay timer can be used for updating its routing table and the delay timer is less than any delay timer at the PLR. The PLR can implement RFC 8333 micro-loop avoidance on packets received via the temporary tunnel. The remote link failure can be identified by Interior Gateway Protocol (IGP) flooding and the PLR is identified as closest to the remote link failure. The steps can further include implementing a heuristic to identify which traffic was impacted by the remote link failure.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
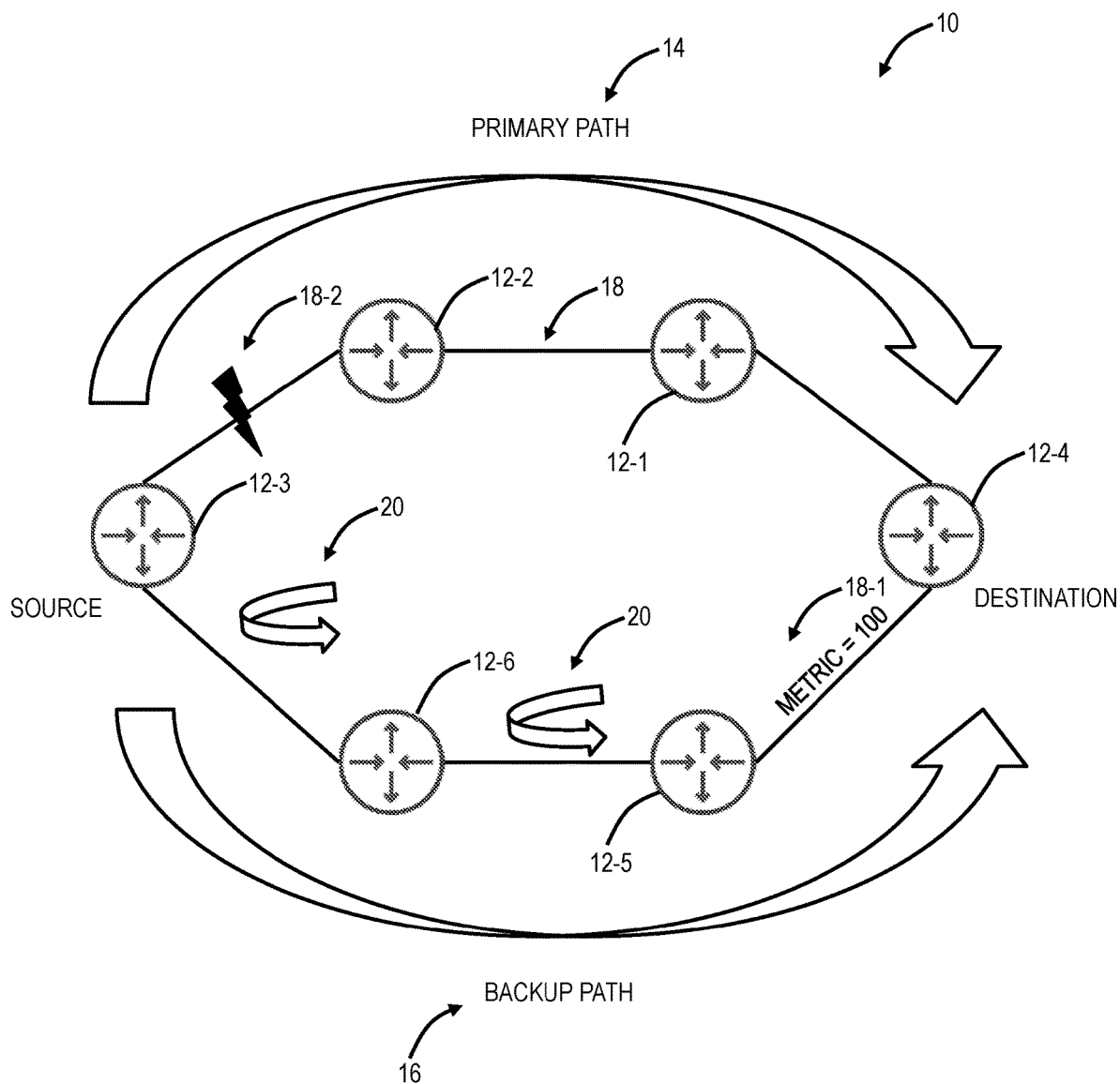
FIG. 1 is a network diagram of an example network for illustrating local micro-loop avoidance.

The present disclosure relates to systems and methods for micro-loop avoidance in networks that utilize tunneling mechanism, e.g., in Multiprotocol Label Switching (MPLS) networks. Specifically, the present disclosure addresses micro-loops due to remote link failures. This approach utilizes a simplified tunneling mechanisms with minimal overhead. The ingenuity of the proposed solution lies in its efficiency—the overhead/footprint of the solution is small while we gain much from it in terms of traffic loss seen during convergence. This helps to meet customers Service Layer Agreement (SLA) requirements, and cleverly utilizes local micro-loop avoidance solutions at the Point of Local Repair (PLR) to handle micro-loops caused due to remote link faults also. Through this solution, if a remote link fails, traffic can leverage existing loop-free backups at the PLR nodes and tunnel its way to reach the destination in a loop-free manner during convergence, thus resulting in minimal to no traffic loss due to micro-loops.

1) When a router learns of a remote link failure, it identifies the PLR closer to itself. 2) It identifies the destinations whose path has changed due to this remote link failure. 3) The router calculates and installs a temporary tunnel for "N" seconds/milliseconds in data plane to steer the traffic destined for the impacted prefixes towards the PLR. This tunneling is achieved by adding on the Node Segment Identifier (SID) of the PLR and sending it via the right interface to the PLR. Once "N" expires, the temporary tunnel is deleted, and post converged paths are installed in data plane. By this time, all the nodes have converged and traffic loss due to micro-loops are avoided. In this manner, the RFC 8333 solution on the PLR is leveraged from remote nodes in the topology to avoid micro-loops around the ring. 4) We also ensure that on the PLR where RFC 8333 is applied, the timers run longer than the timers running on the other nodes—this is to account for the additional time required for tunneling.

Background and Problem Statement

In network topologies, different routers will converge at different times, and we cannot assume ordered convergence. This is because there are various factors that impact when Shortest Path First (SPF) runs trigger—such as the system capabilities, scale on the device, SPF timers, timing of received Label Switched Paths (LSPs)/Link State Advertisements (LSAs), etc. Due to this, micro-loops will occur at convergence time which lead to traffic loss.

When a link fails in a network there are two phases:
i) Switchover
ii) Convergence Traffic loss due to micro-loops occurs at the convergence phase. Hence, in addition to deploying effective solutions for fast switchover (such as using protocols like BFD and/or other lower layer mechanisms), we also need to implement solutions to address micro-loops. Only then can we effectively achieve a stable, no-to-minimal traffic loss in MPLS networks with Fast Reroute (FRR) capabilities.

IETF RFC 8333 Solution for Local Micro-Loop Avoidance

FIG. 1 is a network diagram of an example network 10 for illustrating local micro-loop avoidance. The network 10 includes a topology with Segment Routing and Topology-Independent Loop-Free Alternate (TI-LFA) enabled. The network 10 includes a plurality of nodes 12 (labeled nodes 12-1 to 12-6). The nodes 12 can be referred to as network elements, routers, etc. In this example, the node 12-3 is a source and the node 12-4 is a destination with a primary path 14 and a backup path 16. For illustration purposes, each link 18 has a default metric, e.g., 10, except for a link 18-1 between the nodes 12-4, 12-5 whose metric is 100. The primary path 14 is Node 12-3→Node 12-2→Node 12-1→Node 12-4. The backup path 16 is Node 12-3→Node 12-6→Node 12-5→Node 12-4. Those skilled in the art will recognize other topologies and network configurations are contemplated. Also, the high link metric is shown on the link 18-1 to make the example easier to illustrate.

Since the link 18-1 has a high metric, a TILFA backup will be calculated at Node 12-3 for Destination Node 12-4. There are TILFA backups calculated on Node 12-2 and Node 12-1 as well for destination Node 12-4.

In FIG. 1, if a link 18-2 between the Nodes 12-3, 12-2 goes down, the routers can converge in different order and can cause micro-loops 20. This is because in the original closed ring topology, prior to the link fault, the primary path from the Node 12-6 to Node 12-4 is clockwise via Node 12-3. Similarly, the pre-fault primary path from Node 12-5 to Node 12-4 is via Node 12-6. This is due to the high metric link 18-1. When the Node 12-3-Node 12-2 link 18-2 fails, Node 12-3 may converge soon after SPF and start sending traffic to Node 12-6 to reach Node 12-4. If Node 12-6 is slow to run SPF, it will send the traffic back to Node 12-3 for destination Node 12-4. Once Node 12-6 converges, it will send traffic to Node 12-5 for destination Node 12-4. If Node 12-5 is slower, traffic is routed back to Node 12-6 for destination Node 12-4. In this manner transient micro-loops 20 can occur throughout the ring until all the routers are converged.

The solution illustrated in RFC 8333 is thus: When a node 12 identifies a local link fault scenario, as part of the switchover phase, lower layers/protocols (such as Bidirectional Forwarding Detection (BFD)) identify the fault and trigger a fast switchover.

In this example, we consider Node 12-3-Node 12-2 link 18-2 failure. With RFC 8333 solution enabled on Node 12-3, even after it runs SPF due to the Node 12-3-Node 12-2 fault, it will not program it's post converged route into the data plane for "N" seconds. (N is a configurable value we call rib-update-delay). Node 12-3 may update the control plane tables with the post converged paths, but it will hold off on pushing the update to data plane. Thus, the traffic will run on the loop-free backup path from Node 12-3 to Node 12-4 for a longer period of time. Once "N" seconds/milliseconds have elapsed, Node 12-3 will program the new converged path into data plane: which is Node 12-3→Node 12-6→Node 12-5→Node 12-4. At this point there is no more backup on the ring.

Limitations of RFC 8333

Figure 2:
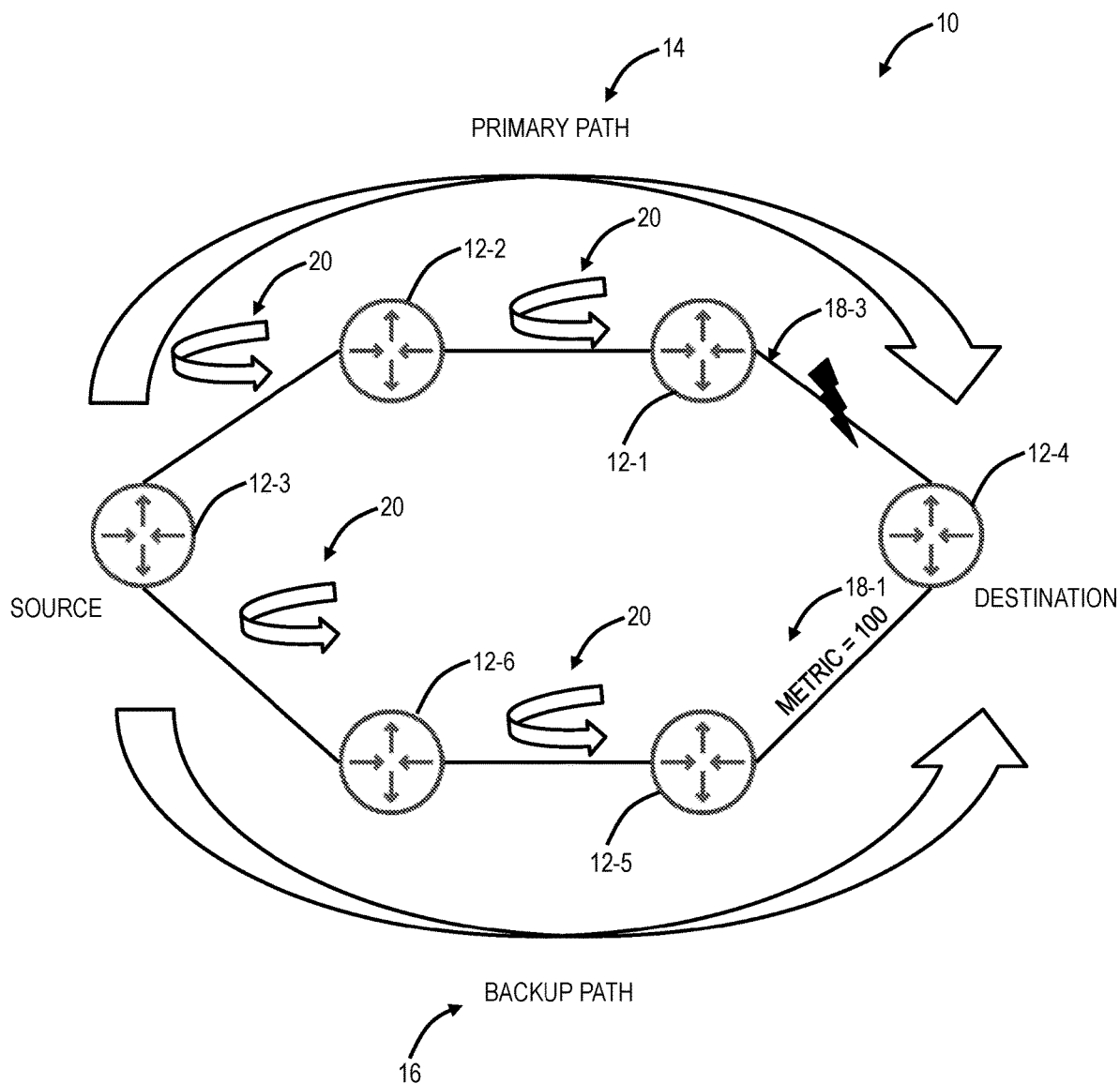
FIG. 2 is a network diagram of the example network for illustrating remote micro-loops.

RFC 8333 only addresses micro-loops caused by local link down failures. Remote link failures can also cause micro-loops as seen in FIG. 2. Here, link 18-3 between Nodes 12-1, 12-4 link has gone down, and Node 12-1 will kick off its RFC 8333/Local Micro-loop solution which will help traffic running from Node 12-1 to Node 12-4.

However, for traffic streams running from Node 12-3 to Node 12-4, this does not help, since micro-loops can occur round the ring topology based on convergence. Once again, this is because for routers at the Nodes 12-2, 12-3, 12-6 and 12-5, the pre-fault path to reach Node 12-4 is clockwise, and it takes time for all the routers to learn of and run SPF in response to the link 18-3 failure.

Other Approaches with Consideration of Micro-Loops at Remote Nodes.

A draft of Micro-loop avoidance using SPRING available online at datatracker.ietf.org/doc/html/draft-hegde-rtgwg-microloop-avoidance-using-spring/ ("draft") (Jul. 3, 2017), the contents of which are incorporated by reference in their entirety, discusses an approach of shipping traffic to the PLR node in link down and link up scenarios. For link down, the above draft re-directs to the near-end PLR. For Link up, the above draft redirects to the near-end PLR, but without using the adjacency SID of the link that's coming up. Additionally, the draft appears to use a simple next-hop change check to screen for impacted prefixes. Also, the draft appears to use a single timer value at both PLR nodes and remote nodes.

The present disclosure builds upon the draft as described as follows.

Solution—Link Down

Figure 3A:
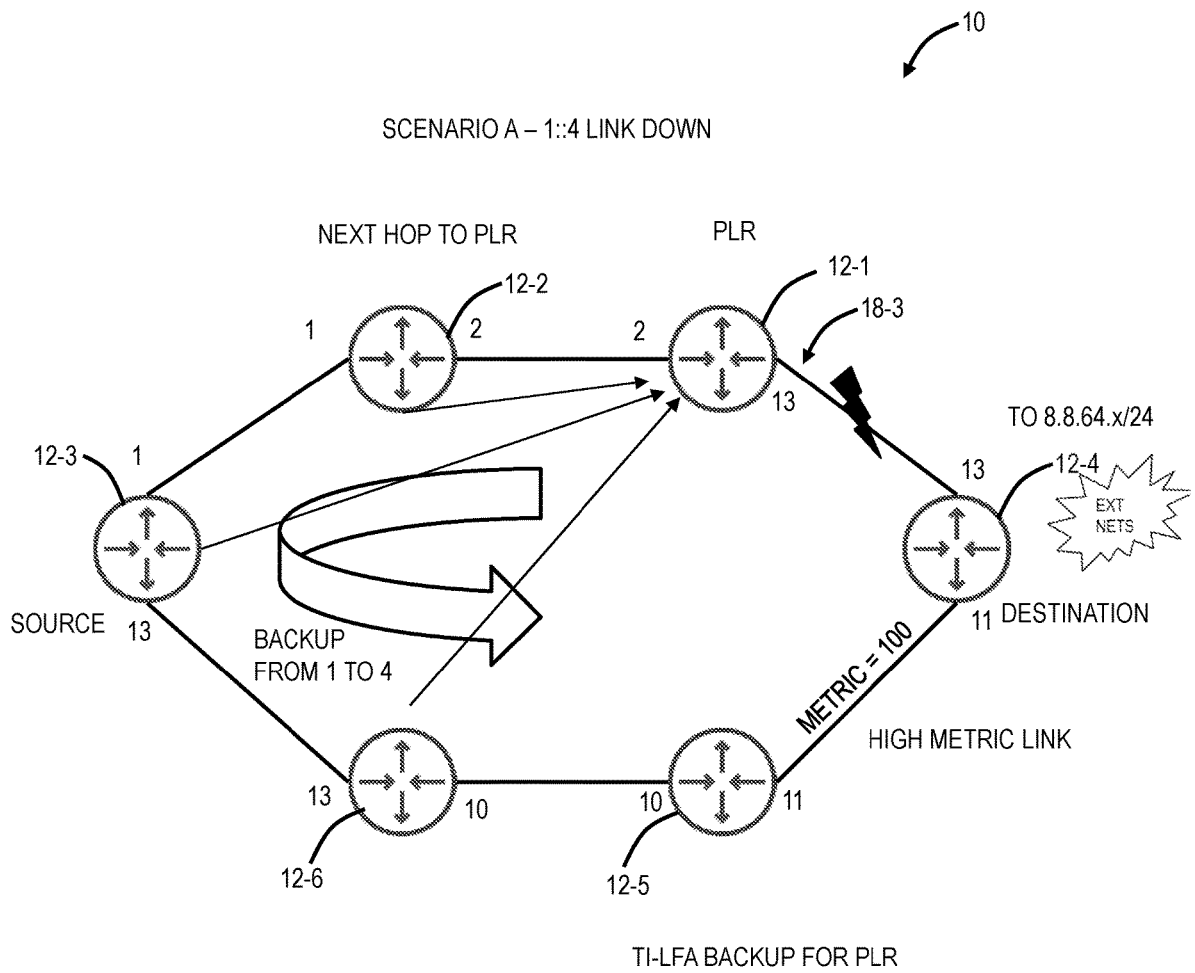
FIGS. 3A and 3B are network diagrams of the example network for illustrating remote micro-loops and avoidance thereof according to the present disclosure.

In our new proposed solution, the following stages can occur:

1) Identification of Link Down and Detection of Nearer End: A router detects that a remote link has gone down and runs logic to identify the closer end of the link and the farther end of the link by measuring the distance to the nearer and farther end of the link. In FIG. 3A, Node 12-3 will detect the Node 12-1-Node 12-4 Link 18-3 down (via Interior Gateway Protocol (IGP) flooding) and will deduce that Node 12-1 is the closer endpoint to itself. Node 12-1 is identified as the PLR. In the event that both ends of the link are seen to be equidistant from this router, no action is taken by this proposal.

2) Identification of Impacted Prefixes: Node 12-3 runs SPF and identifies all the routes that have changed as a result of the link fault between Node 12-1-Node 12-4. Running Djikstra's algorithm on Node 12-3 (with itself as root) during SPF calculation reveals that next-hops to Node 12-2, Node 12-1, Node 12-6, Node 12-5 have not changed, since the most optimal path to reach these nodes have not changed, even without the Node 12-1-Node 12-4 link. Dijkstra's run in the SPF reveals that the new path to reach Node 12-4 is through Node 12-6 and Node 12-5, and hence only the route towards Node 12-4 has changed with a new next hop of Node 12-6.

It is to be noted that only prefixes that are impacted by the single link failure and those that will converge to a different path post SPF will apply this tunneling mechanism. No tunnel over-ride will be applied for prefixes that did not change their next-hop or path metric post SPF. For link-down scenarios, we check that the pre-SPF next-hop to reach the destination is the same as post-SPF next-hop to reach the PLR. Consequently, only the route to Node 12-4 will be identified as eligible for a Micro-loop Avoidance Protection tunnel. It is to be noted that all links and networks behind node 12-4 will also see a next-hop change and hence any prefixes behind (reachable through) Node 12-4 will also be eligible for a Micro-loop Avoidance Tunnel Protection. Consequently, network 8.8.64.0/24, which is reachable behind node 4 will also be protected with a Micro-loop avoidance tunnel.

3) Generation of Tunnel Labels and Installation of Tunnel Route: For impacted prefixes, Node 12-3 tunnels the traffic to the identified PLR for "N" seconds—a tunable rib-update-delay (Routing Information Block) timer. The rib-update-delay time is from RFC 8333 and is a delay to wait before updating the node's forwarding table and stop using RFC 8333 micro-loop avoidance. This tunneling is achieved by adding the Node SID of the PLR and using the right interface to reach it and installing this temporary path in data plane. (Penultimate Hop Popping (PHP) cases are special cases where we do not push a Node SID, however the traffic is steered by using the right interface towards the PLR). In our example here, Node 12-3 identifies that its path to Node 12-4 has changed due to the Node 12-1-Node 12-4 fault, and the PLR is Node 12-1, so Node 12-3 tunnels this traffic (with destination of Node 12-4) to Node 12-1. In this case Node 12-3 will push the Node-SID of Node 12-1 (on traffic destined to Node 12-4) and sends it over the Node 12-3-Node 12-2 link. This tunneling lasts "N" seconds. We can note that all the nodes in the topology who have determined that the path to the destination (Node 12-4 here) has changed due to this link failure will do the same—i.e., Nodes 12-2, 12-3, 12-6, and 12-5 will tunnel their packets to Node 12-1.

4) Route Handling at the PLR: Now the packets that reach Node 12-1 will be routed via the loop-free backup path on Node 12-1 towards Node 12-4, thus avoiding micro-loops during convergence. (This is the RFC 8333 solution as explained in the previous section). Thus, we are leveraging the RFC 8333 solution from remote nodes also.

5) We also ensure that the rib-update-delay timer on the PLR (Here, Node 12-1) runs at a longer duration than the rib-update-delay (N) on Nodes 12-2, 12-3, 12-6, 12-5 in order to account for the incoming tunneling from remote nodes and thus, keep the backup on Node 12-1 alive for longer.

Solution—Link Up

Figure 3B:
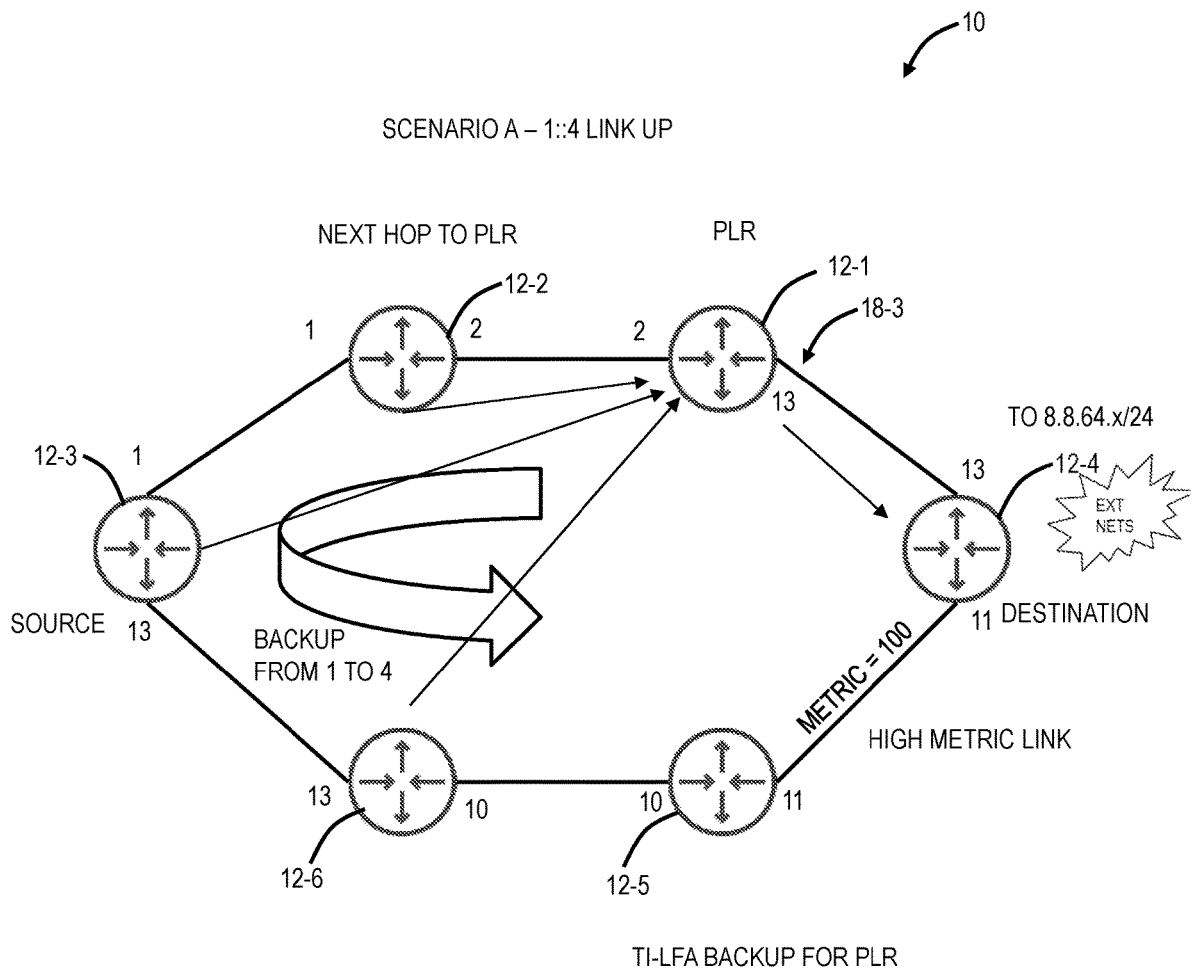

In the case of link up, we take a similar approach, whereby, the near end of the link is located, impacted prefixes are identified and then, a Micro-loop Avoidance Tunnel is installed as the forwarding entry for such prefixes. The forwarding entry points to the near end of the link and redirects traffic over the newly brought up link at the near end of the link for a configurable timer duration of N seconds. A few salient steps are detailed below:

1) Identification of Impacted Prefixes. Node 12-3 runs SPF and identifies all the routes that have changed as a result of the new link up between Node 12-1-Node 12-4. Running Djikstra's algorithm (see FIG. 3B) on Node 12-3 (with itself as root) during SPF calculation reveals that next-hops to Node 12-2, Node 12-1, Node 12-6, Node 12-5 have not changed, since the most optimal path to reach these nodes have not changed, even with the new Node 12-1-Node 12-4 link. Dijkstra's run in the SPF reveals that the new path to reach Node 12-4 is through Node 12-2 and Node 12-1, and hence only the route towards Node 12-4 has changed with a new next hop of Node 12-2.

It is to be noted that only prefixes that are impacted by the link coming up and those will converge to a different path post SPF will apply this tunneling mechanism. No tunnel over-ride will be applied for prefixes that did not change their next-hop or path metric post SPF. For link-up scenarios, we ensure that the post-SPF next-hop to reach the destination is the same as the post-SPF next-hop to reach the nearer end of the link-up endpoints before installing an appropriate temporary micro=loop avoidance tunnel over-ride.

Consequently, only the route to Node 12-4 will be identified as eligible for a Micro-loop Avoidance Protection tunnel. It is to be noted that all links and networks behind node 12-4 will also see a next-hop changed and hence any prefixes behind (reachable through) Node 12-4 will also be eligible for a Micro-loop Avoidance Tunnel Protection—for example, network 8.8.64.0/24 behind node 12-4 will be protected with a micro-loop avoidance tunnel as well.

2) Route Handling at the PLR: Now the packets that reach Node 12-1 will be routed via the new link on Node 12-1 towards Node 12-4, thus avoiding micro-loops during convergence. Remote nodes apply the tunnel labels for a total duration of N seconds.

Identification of Impacted Prefixes

Again, the present disclosure builds upon the approach of shipping affected traffic to the PLR node 12-1 in order to leverage the link switchover at the PLR node 12-1 and uses the following heuristic to identify which traffic was impacted by the link down event.

It is to be noted that only prefixes that are impacted by the single link failure and those that will converge to a different path post SPF will apply this tunneling mechanism. No tunnel over-ride will be applied for prefixes that did not change their next-hop or path metric post SPF.

Additionally, for link-down scenarios, we check that the pre-SPF next-hop to reach the destination is the same as post-SPF next-hop to reach the PLR.

Consequently, only the route to Node 4 will be identified as eligible for a Micro-loop Avoidance Protection tunnel.

It is to be noted that all links and networks behind node 4 will also see a next-hop change and hence any prefixes behind (reachable through) Node 4 will also be eligible for a Micro-loop Avoidance Tunnel Protection. Consequently, network 8.8.64.0/24, which is reachable behind node 4 will also be protected with a Micro-loop avoidance tunnel.

Separately Configurable Timers for Remote Nodes and PLR Nodes

Again, the present disclosure uses the general approach of shipping affected traffic to the PLR node i12-1 *n* order to leverage the link switchover at the PLR node 12-1 and uses the following heuristic to identify which traffic was impacted by the link down event.

Our proposal offers separately configurable timers at remote and local PLR nodes. Using a static linear or multiplicative relationship between timers at remote nodes and at the PLR nodes can lead to a one-size-fits-all type of situation, where the timer values may not fit all situations in terms of route scale and network size. Having separately configurable timers at remote and local PLR nodes, subject to the caveat that the timer at local PLR needs to be higher than the timer at remote nodes, provides more flexibility with regard to route scale and network size.

Having separate timers at the PLR node, and remote nodes allows RFC 8333 to be implemented and enabled independent of any remote micro-loop avoidance solutions.

Identification of Network Events

When the following events occur in the network: Link up, Link down, Metric increase or decrease, LSPs or LSAs are flooded by both end-points undergoing that change. When a remote node receives these LSPs, or a local node is notified of the local event via platform notifications, we allocate a buffer of 2 to store the changes. The following logic is implemented:

1. If the cache is full with 2 LSPs or LSAs, a comparison check is run to validate that both LSPs speak of the same event.
2. If the outcome of the comparison logic in cache is different, the rib-update-delay is not started or stopped if running.
3. If another LSP or LSA is received when the cache buffer is full, the rib-update-delay is not started or stopped if running.

Using the above logic, we can identify the need to apply micro-loop-avoidance mechanisms in a simple and efficient manner.

Benefits of the Proposed Solution

The ingenuity of the proposed solution lies in how simple it is—the overhead/footprint of the solution is small while we gain much from it in terms of traffic loss seen during convergence. This helps us meet our customers SLA requirements, and cleverly utilizes local micro-loop avoidance solutions at the PLR to handle micro-loops caused due to remote link faults also. For link down, the proposal leverages the backup path installed for affected prefixes at the PLR and we recommend that this proposal be used in conjunction with TI-LFA backup generation enabled on all nodes, along with the RFC 8333 solution being enabled on all nodes.

Example Node

Figure 4:
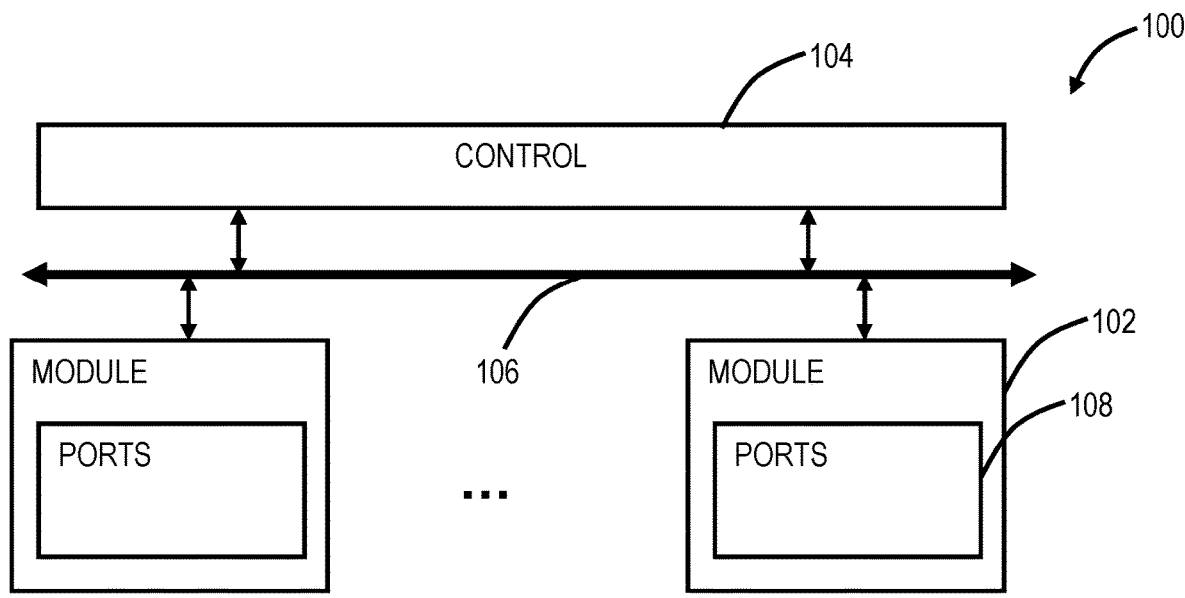
FIG. 4 is a block diagram of an example implementation of a node.

FIG. 4 is a block diagram of an example implementation of a node 100, such as for any of the nodes 12 in the network 10. Those of ordinary skill in the art will recognize FIG. 4 is a functional diagram in an oversimplified manner, and a practical embodiment may include additional components and suitably configured processing logic to support known or conventional operating features that are not described in detail herein.

In an embodiment, the node 100 is a packet switch, but those of ordinary skill in the art will recognize the systems and methods described herein can operate with other types of network elements and other implementations that support SR networking. In this embodiment, the node 100 includes a plurality of modules 102, 104 interconnected via an interface 106. The modules 102, 104 are also known as blades, line cards, line modules, circuit packs, pluggable modules, etc. and generally refer to components mounted on a chassis, shelf, etc. of a data switching device, i.e., the node 100. Each of the modules 102, 104 can include numerous electronic devices and/or optical devices mounted on a circuit board along with various interconnects, including interfaces to the chassis, shelf, etc.

Two example modules are illustrated with line modules 102 and a control module 104. The line modules 102 include ports 108, such as a plurality of Ethernet ports. For example, the line module 102 can include a plurality of physical ports disposed on an exterior of the module 102 for receiving ingress/egress connections. Additionally, the line modules 102 can include switching components to form a switching fabric via the interface 106 between all of the ports 108, allowing data traffic to be switched/forwarded between the ports 108 on the various line modules 102. The switching fabric is a combination of hardware, software, firmware, etc. that moves data coming into the node 100 out by the correct port 108 to the next node 100. "Switching fabric" includes switching units in a node; integrated circuits contained in the switching units; and programming that allows switching paths to be controlled. Note, the switching fabric can be distributed on the modules 102, 104, in a separate module (not shown), integrated on the line module 102, or a combination thereof.

The control module 104 can include a microprocessor, memory, software, and a network interface. Specifically, the microprocessor, the memory, and the software can collectively control, configure, provision, monitor, etc. the node 100. The network interface may be utilized to communicate with an element manager, a network management system, the PCE 20, etc. Additionally, the control module 104 can include a database that tracks and maintains provisioning, configuration, operational data, and the like.

Again, those of ordinary skill in the art will recognize the node 100 can include other components which are omitted for illustration purposes, and that the systems and methods described herein are contemplated for use with a plurality of different network elements with the node 100 presented as an example type of network element. For example, in another embodiment, the node 100 may include corresponding functionality in a distributed fashion. In a further embodiment, the chassis and modules may be a single integrated unit, namely a rack-mounted shelf where the functionality of the modules 102, 104 is built-in, i.e., a "pizza-box" configuration. That is, FIG. 4 is meant to provide a functional view, and those of ordinary skill in the art will recognize actual hardware implementations may vary.

Example Controller

Figure 5:
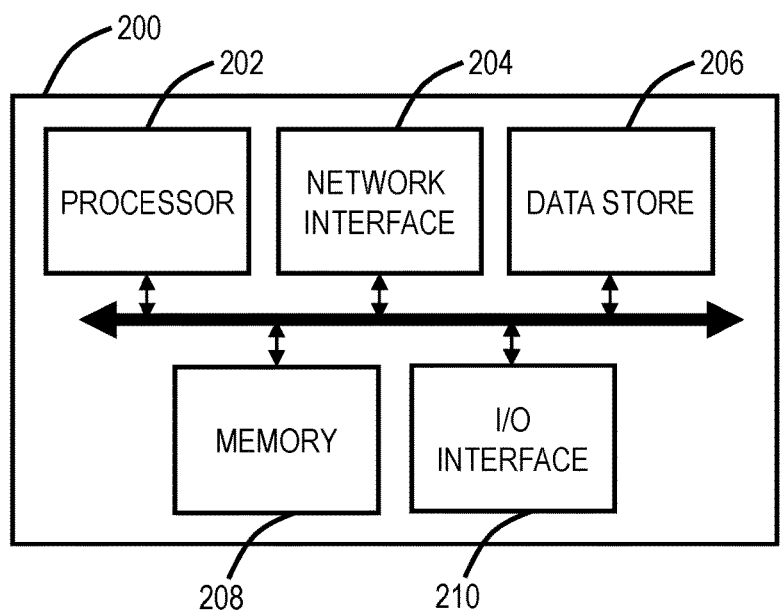
FIG. 5 is a block diagram of an example processing device.

FIG. 5 is a block diagram of an example processing device 200, which can form a control module for a network element, the PCE 20, etc. The processing device 200 can be part of the network element, or a stand-alone device communicatively coupled to the network element. Also, the processing device 200 can be referred to in implementations as a control module, a shelf controller, a shelf processor, a system controller, etc. The processing device 200 can include a processor 202 which is a hardware device for executing software instructions. The processor 202 can be any custom made or commercially available processor, a central processing unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory, to communicate data to and from the memory, and to generally control operations of the processing device 200 pursuant to the software instructions. The processing device 200 can also include a network interface 204, a data store 206, memory 208, an I/O interface 210, and the like, all of which are communicatively coupled to one another and to the processor 202.

The network interface 204 can be used to enable the processing device 200 to communicate on a data communication network, such as to communicate to a management system, to the nodes 12, the like. The network interface 204 can include, for example, an Ethernet module. The network interface 204 can include address, control, and/or data connections to enable appropriate communications on the network. The data store 206 can be used to store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the processing device 200 to communicate with other devices.

Process

Figure 6:
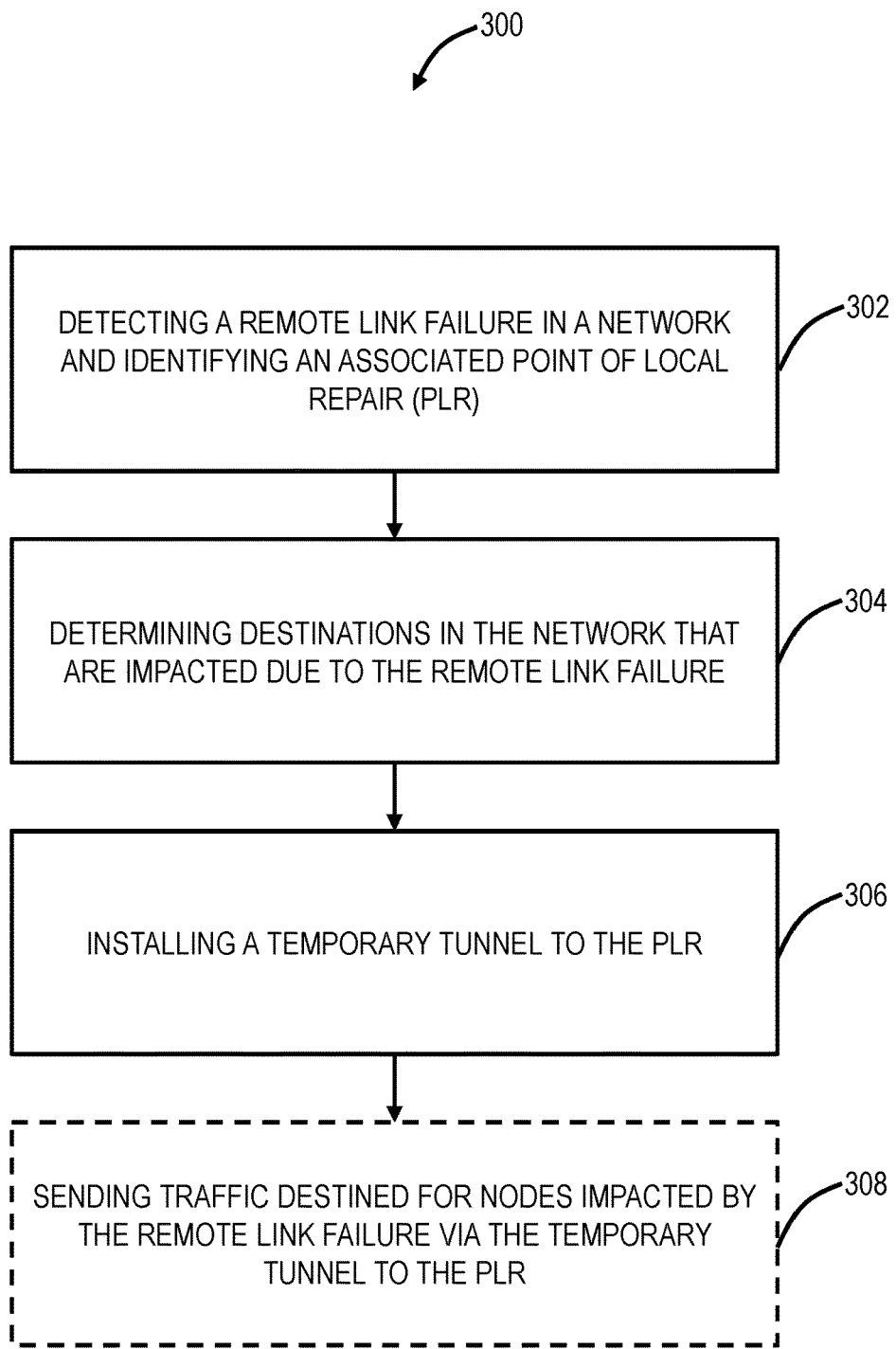
FIG. 6 is a flowchart of a process implemented by a node for micro-loop avoidance.

FIG. 6 is a flowchart of a process 300 implemented by a node for micro-loop avoidance. The process 300 contemplates implementation as a method having steps; a node including a plurality of ports, switching circuitry, and a controller configured to implement the steps; and a non-transitory computer-readable medium having instructions stored thereon for programming a node to perform the steps.

The steps include detecting a remote link failure in a network and identifying an associated Point of Local Repair (PLR) (step 302); determining destinations in the network that are impacted due to the remote link failure (step 304); and installing a temporary tunnel to the PLR (step 306). The steps can further include sending traffic destined for nodes impacted by the remote link failure via the temporary tunnel to the PLR (step 308).

The temporary tunnel can be implemented by a node Segment Identifier (SID) for the PLR. The temporary tunnel can be implemented for a predetermined time period, and wherein the steps can further include deleting the temporary tunnel upon expiry of the predetermined time, wherein the predetermined time is selected to ensure convergence at nodes in the network.

The node can have a delay timer for updating its routing table and the delay timer is less than any delay timer at the PLR. The PLR implements RFC 8333 micro-loop avoidance on packets received via the temporary tunnel. The remote link failure can be identified by Interior Gateway Protocol (IGP) flooding and the PLR is identified as closest to the remote link failure.

CONCLUSION

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A node configured for micro-loop avoidance, the node comprising:
   a plurality of ports and switching circuitry configured to switch packets between the plurality of ports, and a controller configured to
      detect a remote link failure in a network and identify an associated Point of Local Repair (PLR), determine destinations in the network that are impacted due to the remote link failure, and cause installation of a temporary tunnel to the PLR that is located adjacent to the remote link failure, wherein the temporary tunnel forwards traffic for the determined destinations to the PLR which reroutes the traffic via a loop-free backup path.

2. The node of claim 1, wherein the plurality of ports and the switching circuitry are configured to send traffic destined for nodes impacted by the remote link failure via the temporary tunnel to the PLR.

3. The node of claim 1, wherein the temporary tunnel is implemented by a node Segment Identifier (SID) for the PLR.

4. The node of claim 1, wherein the temporary tunnel is implemented for a predetermined time period, and wherein the controller is further configured to delete the temporary tunnel upon expiry of the predetermined time, wherein the predetermined time is selected to ensure convergence at nodes in the network.

5. The node of claim 1, wherein the node has a delay timer for updating its routing table and the delay timer is less than any delay timer at the PLR.

6. The node of claim 1, wherein the PLR implements RFC 8333 micro-loop avoidance on packets received via the temporary tunnel.

7. The node of claim 1, wherein the remote link failure is identified by Interior Gateway Protocol (IGP) flooding and the PLR is identified as closest to the remote link failure.

8. The node of claim 1, wherein the controller is further configured to implement a heuristic to identify which traffic was impacted by the remote link failure.

9. A method implemented by a node for micro-loop avoidance, the method comprising steps of:

detecting a remote link failure in a network and identifying an associated Point of Local Repair (PLR);

determining destinations in the network that are impacted due to the remote link failure; and installing a temporary tunnel to the PLR that is located adjacent to the remote link failure, wherein the temporary tunnel forwards traffic for the determined destinations to the PLR which reroutes the traffic via a loop-free backup path.

10. The method of claim 9, wherein the steps further include sending traffic destined for nodes impacted by the remote link failure via the temporary tunnel to the PLR.

11. The method of claim 9, wherein the temporary tunnel is implemented by a node Segment Identifier (SID) for the PLR.

12. The method of claim 9, wherein the temporary tunnel is implemented for a predetermined time period, and wherein the steps further include deleting the temporary tunnel upon expiry of the predetermined time, wherein the predetermined time is selected to ensure convergence at nodes in the network.

13. The method of claim 9, wherein the node has a delay timer for updating its routing table and the delay timer is less than any delay timer at the PLR.

14. The method of claim 9, wherein the PLR implements RFC 8333 micro-loop avoidance on packets received via the temporary tunnel.

15. The method of claim 9, wherein the remote link failure is identified by Interior Gateway Protocol (IGP) flooding and the PLR is identified as closest to the remote link failure.

16. A non-transitory computer-readable medium having instructions stored thereon for programming a node to perform steps of:

detecting a remote link failure in a network and identifying an associated Point of Local Repair (PLR);

determining destinations in the network that are impacted due to the remote link failure; and installing a temporary tunnel to the PLR that is located adjacent to the remote link failure, wherein the temporary tunnel forwards traffic for the determined destinations to the PLR which reroutes the traffic via a loop-free backup path.

17. The non-transitory computer-readable medium of claim 16, wherein the steps further include sending traffic destined for nodes impacted by the remote link failure via the temporary tunnel to the PLR.

18. The non-transitory computer-readable medium of claim 16, wherein the temporary tunnel is implemented by a node Segment Identifier (SID) for the PLR.

19. The non-transitory computer-readable medium of claim 16, wherein the temporary tunnel is implemented for a predetermined time period, and wherein the steps further include deleting the temporary tunnel upon expiry of the predetermined time, wherein the predetermined time is selected to ensure convergence at nodes in the network.

20. The non-transitory computer-readable medium of claim 16, wherein the node has a delay timer for updating its routing table and the delay timer is less than any delay timer at the PLR.

* * * * *